United States Patent
Yamazaki

(10) Patent No.: US 7,072,000 B2
(45) Date of Patent: Jul. 4, 2006

(54) PROJECTION TYPE COLOR IMAGE DISPLAY UNIT

(75) Inventor: Shunpei Yamazaki, Tokyo (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 10/014,567

(22) Filed: Dec. 11, 2001

(65) Prior Publication Data

US 2002/0041341 A1 Apr. 11, 2002

Related U.S. Application Data

(63) Continuation of application No. 08/950,268, filed on Oct. 14, 1997.

(30) Foreign Application Priority Data

Oct. 16, 1996 (JP) .............................. 8-294547

(51) Int. Cl.
*H04N 9/31* (2006.01)

(52) U.S. Cl. ................. 348/744; 348/751; 348/675

(58) Field of Classification Search ................ 348/674, 348/675, 676, 745, 746, 747, 750, 751, 655, 348/742, 739, 744; 345/32, 95, 92; 349/79, 349/106; 359/52; H04N 9/31
See application file for complete search history.

(56) References Cited

U.S. PATENT DOCUMENTS

| | | | |
|---|---|---|---|
| 5,260,797 A | | 11/1993 | Muraji et al. |
| 5,315,378 A | * | 5/1994 | Satou et al. ................ 348/655 |
| 5,337,171 A | | 8/1994 | Mase et al. |
| 5,386,306 A | * | 1/1995 | Gunjima et al. .............. 359/52 |
| 5,452,019 A | | 9/1995 | Fukuda et al. |
| 5,574,516 A | * | 11/1996 | Kanai et al. ................ 348/742 |
| 5,625,474 A | * | 4/1997 | Aomori et al. ............... 349/79 |
| 5,639,698 A | | 6/1997 | Yamazaki et al. |
| 5,671,023 A | * | 9/1997 | Nishiwaki et al. ......... 348/675 |
| 5,734,457 A | * | 3/1998 | Mitsui et al. ............... 349/106 |
| 5,784,129 A | * | 7/1998 | Konuma et al. ............ 348/739 |
| 5,789,763 A | * | 8/1998 | Kato et al. .................... 257/72 |
| 5,877,740 A | * | 3/1999 | Hirakata et al. ............ 345/103 |
| 5,886,745 A | * | 3/1999 | Muraji et al. ............... 348/448 |
| 6,011,533 A | * | 1/2000 | Aoki .......................... 345/92 |
| 6,013,928 A | * | 1/2000 | Yamazaki etal. ........... 257/347 |

* cited by examiner

*Primary Examiner*—Sherrie Hsia
(74) *Attorney, Agent, or Firm*—Fish & Richardson P.C.

(57) ABSTRACT

In a projection type color display unit having three optical shutters formed on substrates corresponding to three primary colors, a color separation circuit and a digitalizing circuit are provided on each substrate having the optical shutter, and signals corresponding to the respective colors which are outputted from those three digitalizing circuits are compared with each other and arithmetically operated, to thereby reduce a noise.

6 Claims, 4 Drawing Sheets

PROJECTION TYPE COLOR IMAGE DISPLAY UNIT

This is a continuation of U.S. application Ser. No. 08/950,268, filed Oct. 14, 1997.

BACKGROUND OF THE INVENTION

1. Field of the Invention

The present invention relates to a projection type color image display unit which composes three images transmitted through three optical shutters corresponding to three primary colors to obtain a color image.

2. Description of the Related Art

The display unit is roughly classified into a direct type and a projection type, and in case of a large screen display, the projection type is superior to the direct type. There are a variety of the projection type display units one of which is a system using the optical shutter where devices are relatively compactly received therein. The optical shutter has an image display capability, and normally includes pixels in a matrix form. A display unit having a circuit structure of an active matrix type in which a switching element is disposed at each pixel is excellent in contrast. However, a passive matrix type display unit (a simple matrix type) is also used. Further, to shutter a light, a method in which liquid crystal material is used, and the light is shuttered by a voltage or current which is applied to the liquid crystal is simple. It is needless to say that other methods have also been proposed.

Displaying a color image is normally conducted by separating the color image into three color components and composing separated colors. Therefore, three optical shutters are required. The conventional projection type color image display unit is designed as shown in FIGS. 2A and 2B.

In the display unit shown in FIG. 2A, three white lights that have passed through optical systems 2 to 4 from one light source 1 are inputted to optical shutters 8 to 10 through color filters 5 to 7. In other words, those three color filters are red, blue and green, respectively, and the optical shutters corresponding to the respective color filters display images corresponding to the respective primary colors.

Lights that have passed through the optical shutters are converged into one light through optical systems 11 to 13 to produce a color image. This color image is projected onto a screen (FIG. 2A).

In this system, since ⅔ of the incident lights are absorbed by the color filters at the minimum, the light from the light source is not sufficiently utilized with the result that the image becomes dark. In order to solve this problem, a dichroic mirror is employed, and an example thereof is shown in FIG. 2B. U.S. Pat. No. 5,337,171 discloses such a projector, the content of which is incorporated herein by reference.

First, of a white light inputted to a dichroic mirror 14 from a light source 1, lights other than a red light (lights shorter in wavelength than a red light) are reflected, and only the red light is inputted to an optical shutter 10. The remaining lights are inputted to a second dichroic mirror 15. In this example, lights other than a green light (lights shorter in wavelength than a green light), that is, a blue light is reflected and then inputted to an optical shutter 9. A light which are linearly propagated through the second dichroic mirror 15 is green, which is inputted to an optical shutter 8 through a total reflection mirror 16. The lights that have passed through the respective optical shutters are converged into one light through optical systems 11 and 12 to produce a color image. This color image is projected onto a screen (FIG. 2B).

In this system, since no light is absorbed by the color filters, the light can be efficiently utilized. In order to enhance the efficiency, a light from the light source may be an intense light consisting of the spectra of three primary colors. With this, the transmission and reflection of a light at the dichroic mirror are efficiently conducted.

Also, there has been proposed a method in which a red laser 21, a green laser 22 and a blue laser 23 are employed as light sources, and lights which are expanded by beam expanders 24 to 26 are made input to optical shutters 27 to 29, as shown in FIG. 3.

A block diagram of a picture image circuit in the projection type display unit of this type is shown in FIG. 4. A video signal is information of three primary colors which are formed on a carrier wave through the AM-FM composite modulation system. The signal is separated into three primary color signals through demodulation. The demodulation operation is conducted by a "color separation" circuit. At this stage, the respective primary color signals are analog signals, but they are digitalized into digital signals by a subsequent digitalizing circuit (an analog-to-digital converter, an A/D circuit). Then, the respective primary color signals are transmitted to three optical shutters to be subjected to a γ-correction at the circuits provided on the respective optical light shutters. Thereafter, the digital signals are converted into analog signals by a subsequent digital-to-analog circuit (a digital-to-analog converter, a D/A circuit), and then inputted to a display unit (an optical shutter).

The color image display unit with the above structure requires a chip having a color separation circuit and an A/D circuit in addition to those three optical shutters. In other words, at least four parts for constituting the circuit are required at the minimum.

Also, there arises such a problem that in the color separation circuit or the A/D circuit, when a noise is intermingled therein, it cannot be finally removed therefrom.

SUMMARY OF THE INVENTION

The present invention has been made in view of the above problem, and therefore an object of the present invention is to provide a projection type color image display unit which is capable of reducing the number of parts to three at the minimum and also reducing a noise.

In order to achieve the above object, according to a first aspect of the present invention, there is provided a projection type color image display unit, which comprises:

first to third substrates each having an optical shutter;

at least one color separation circuit in each of said first to third substrates;

at least one digitalizing circuit in each of said first to third substrates; and at least one comparing circuit (comparator) for comparing three signals with each other in each of said substrates;

wherein a signal corresponding to red which is outputted from said digitalizing circuit in each of said first to third substrates is inputted to said comparator of said third substrate;

wherein a signal corresponding to green which is outputted from said γ-correction circuit in each of said first, second and third substrates is inputted to said comparator of said second substrate; and wherein a signal corresponding to blue which is outputted from said γ-correction circuit in each of said first, second and third substrates is inputted to said comparator of said first substrate.

In order to achieve the above object, according to a second aspect of the present invention, there is provided a projection type color image display unit, which comprises:

first to third substrates each having an optical shutter;

at least one color separation circuit in each of said first to third substrates;

at least one digitalizing circuit in each of said first to third substrates;

at least one γ-correction circuit in each of said first to third substrates; and at least one comparing circuit (comparator) for comparing three signals with each other in each of said substrates;

wherein a signal corresponding to red which is outputted from said γ-correction circuit in each of said first to third substrates is inputted to said comparator of said third substrate;

wherein a signal corresponding to green which is outputted from said γ-correction circuit in each of said first to third substrates is inputted to said comparator of said second substrate; and wherein a signal corresponding to blue which is outputted from said γ-correction circuit in each of said first to third substrates is inputted to said comparator of said first substrate.

In order to achieve the above object, according to a third aspect of the present invention, there is provided a projection type color image display unit, which comprises:

first to third substrates each having an optical shutter;

at least one color separation circuit in each of said first to third substrates;

at least one digitalizing circuit in each of said first to third substrates;

at least one time-axis correction circuit in each of said first to third substrates; and at least one comparing circuit (comparator) for comparing three signals with each other in each of said substrates;

wherein a signal corresponding to red which is outputted from said time-axis correction circuit in each of said first to third substrates is inputted to said comparator of said third substrate;

wherein a signal corresponding to green which is outputted from said time-axis correction circuit in each of said first to third substrates is inputted to said comparator of said second substrate; and wherein a signal corresponding to blue which is outputted from said time-axis correction circuit in each of said first to third substrates is inputted to said comparator of said first substrate.

The projection type color image display unit according to the present invention is useful in case of applying to a structure in which an active matrix circuit, a peripheral drive circuit, a color separation circuit, an A/D circuit, a comparator circuit, a γ-correction circuit, a D/A circuit and so on are integrated on one substrate using thin-film transistors.

This is because, in the case where the respective circuits are integrated on the same substrate using the thin-film transistors, there are many cases in which the performance of the circuits is dispersed in the respective substrates, but, such dispersion can be suppressed with an employment of the above structure according to the present invention.

In other words, the signals processed in other substrates are compared and employed, thereby being capable of reducing the dispersion of the characteristics of the respective substrates.

In the present invention, various types of the comparators are proposed. For example, it may be a circuit for operating a mean value of three signals. Alternatively, it may be a circuit for outputting signals having two or more identical values among three signals, a circuit for operating a mean value of two values which are the closest among three signals, or the combination thereof.

In any cases, it may be employed a structure through which influence caused by the abnormal value can be reduced as much as possible when there is an abnormal value in three signals. For example, in the case of applying a mean value of three signals in the comparator, the S/N ratio (signal/noise ratio) becomes √3 times.

As is apparent from the above structures, in the present invention, the circuit can be structured by only three optical shutters, and the number of parts can thus be reduced to three at the maximum. Also, since the abnormal value can be reduced by the comparators, the noise or the operation failure is reduced.

Further, according to a fourth aspect of the present invention, there is provided a projection type color display unit, which comprises:

N-substrates (N=3, 4, 5 . . . ) each having an optical shutter;

at least one color separation circuit in each of said substrates; and at least one digitalizing circuit in each of said substrates;

wherein a common digital processing is conducted on all of said substrates; and wherein a digitalized signal which is processed in one of said N-substrates is inputted to another one of said N-substrates.

A specific example of the above structure is shown in FIG. 1. In the structure shown in FIG. 1, A/D circuits which are one kind of the digital circuits are commonly arranged in all of three substrates (N=3) in such a manner that a common processing is conducted in all the A/D circuits.

Also, a signal which has been processed in one substrate is employed in all other substrates.

BRIEF DESCRIPTION OF THE DRAWINGS

These and other objects, features and advantages of the present invention will become more fully apparent from the following detailed description taken with the accompanying drawings in which.

DETAILED DESCRIPTION OF THE PREFERRED EMBODIMENTS

Figure 1:
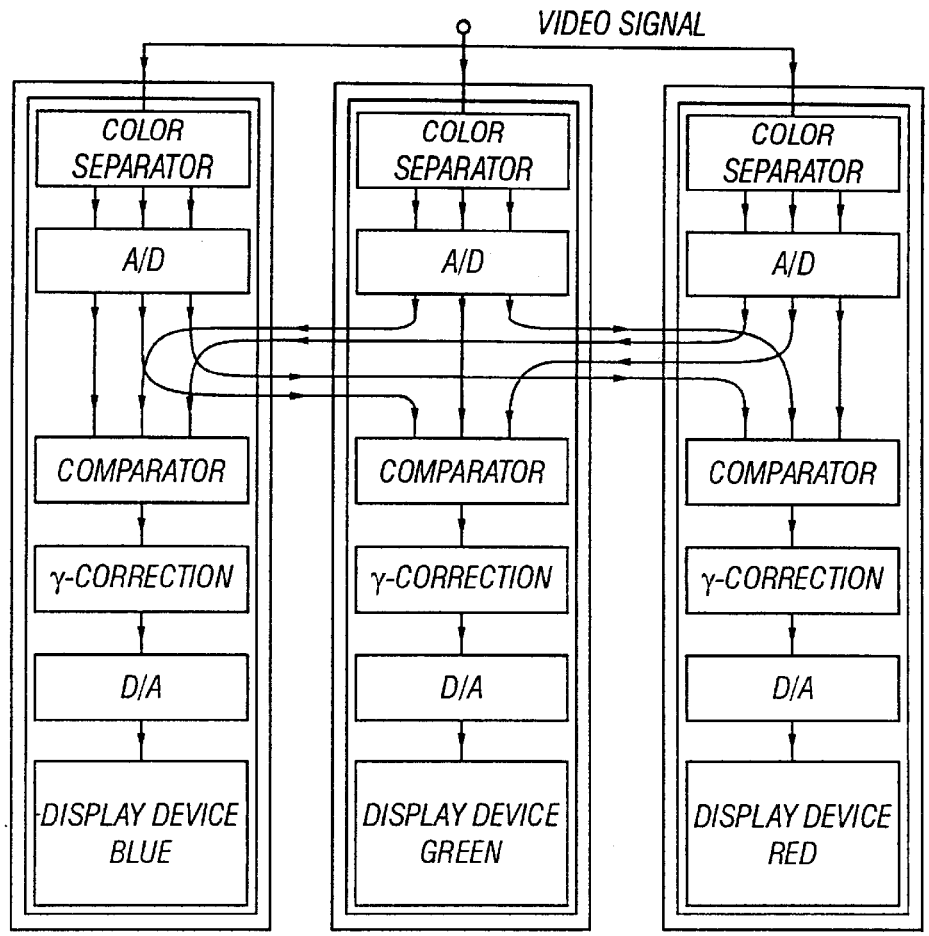
FIG. 1 is a block diagram showing a circuit of a display unit according to a first embodiment of the present invention.
Figure 2A:
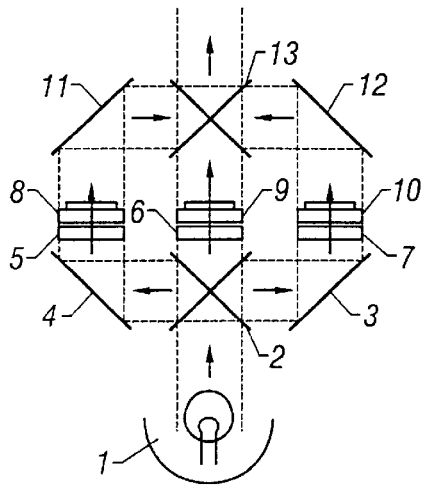
FIGS. 2A and 2B show outlines of general projection type color image display units.
Figure 2B:
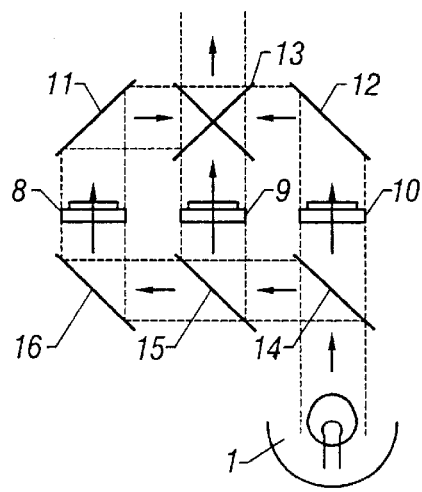
Figure 3:
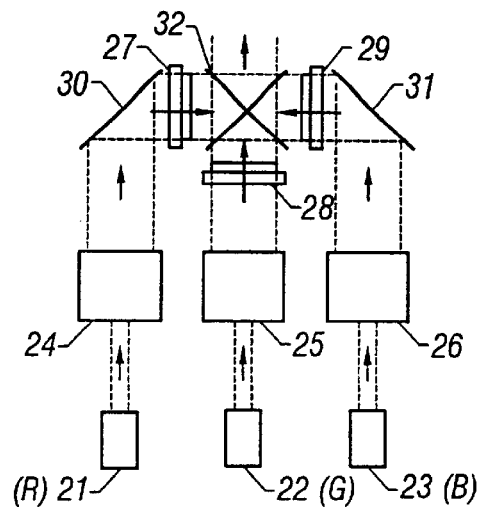
FIG. 3 shows the outline of a projection type color display unit using a laser.
Figure 4:
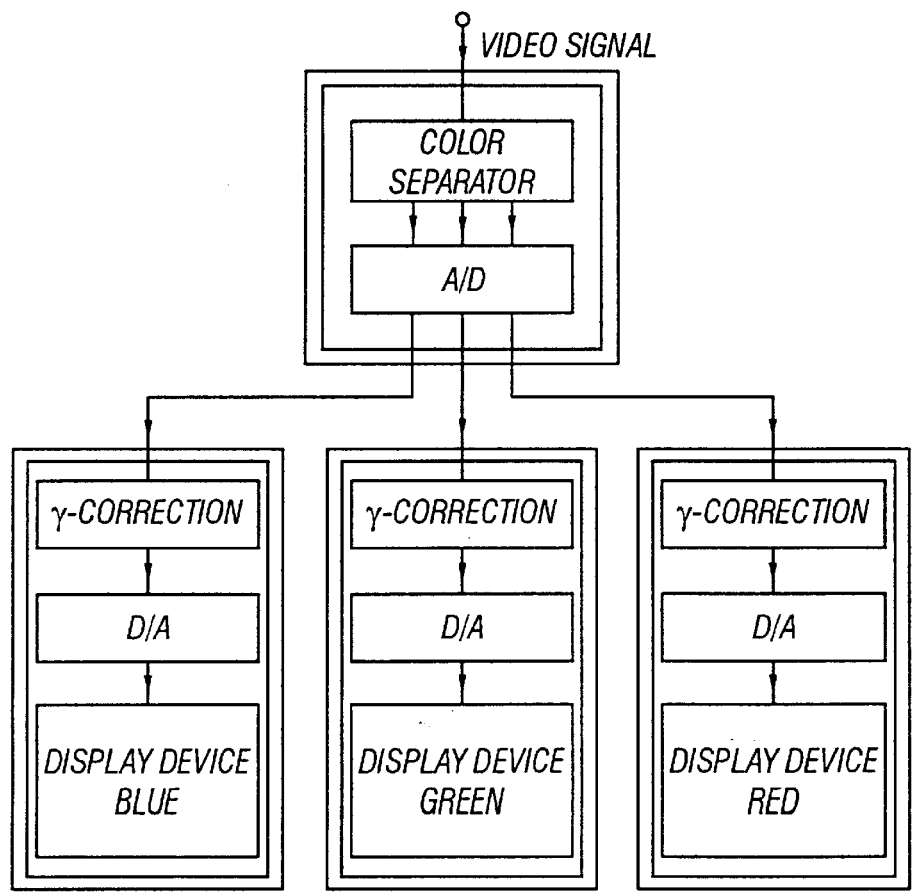
FIG. 4 is a block diagram showing a circuit of a conventional projection type color image display unit.

As shown in FIG. 1, in three liquid-crystal panels for conducting display of blue, green and red, processing up to color separation and A/D conversion are commonly conducted. Then, signals relating to the respective colors which are obtained by the respective A/D circuits are distributed to the respective substrates and used. With this structure, an error accuracy or a S/N ratio can be enhanced.

For example, in case of the structure shown in FIG. 1, signals from the respective A/D circuits disposed on three substrates are inputted to a comparator of a substrate that conducts blue display.

In general, in the case where a glass substrate or a quartz substrate is used as the substrate, and the circuits are made up of thin-film transistors, there exists the dispersion of the circuit performance in the respective substrates. Therefore, signals from the A/D circuits of the respective substrates are dispersed in signal accuracy.

However, the signals from the AID circuits of the respective substrates are compared, or superimposed on each other for use, thereby being capable of reducing the dispersion of the signal accuracy.

Now, a description will be given in more detail of preferred embodiments of the present invention with reference to the accompanying drawings.

(First Embodiment)

FIG. 1 is a circuit block diagram showing a color display unit according to a first embodiment of the present invention. Signal processing circuits of this embodiment are made up of three substrates. Each of the substrates includes a color separation circuit, an A/D circuit, a comparing circuit, a γ-correction circuit, a D/A circuit, and an optical shutter (display unit).

A video signal is separated into three systems which are then inputted to the color separation circuits of the respective three substrates. As a result, in the respective substrates, three primary color signals are obtained which are then converted into digital signals through subsequent A/D circuits. In the figure, a blue signal is outputted to a left output terminal, a green signal is outputted to a center output terminal, and a red signal is outputted to a right output terminal, respectively, among three output terminals of the respective A/D circuits.

As is apparent from the figure, the blue signals outputted from all the A/D circuits (signals outputted from the left output terminals of the A/D circuit) are inputted to the comparing circuit of the left substrate (having a blue optical shutter), the green signals outputted from all the A/D circuits (the signals outputted from the center output terminals of the respective A/D circuits) are inputted to the comparing circuit of the center substrate (having a green optical shutter), and the red signals outputted from all the A/D circuits (signals outputted from the right output terminals of the respective A/D circuits) are inputted to the comparing circuit of the right substrate (having a red optical shutter). Then, those signals are arithmetically operated in the respective comparing circuits.

Signals outputted from the respective comparing circuits are transmitted through γ-correction circuits and D/A circuits in the respective substrates, and are displayed on the respective optical shutters (display units).

In the above structure, a glass substrate or a quartz substrate is used as the substrate, and the respective circuits are made up of thin-film transistors formed of crystalline silicon films. U.S. Pat. No. 5,639,698 discloses a method of manufacturing crystalline thin film transistors, the content of which is incorporated herein by reference.

(Second Embodiments)

Figure 5:
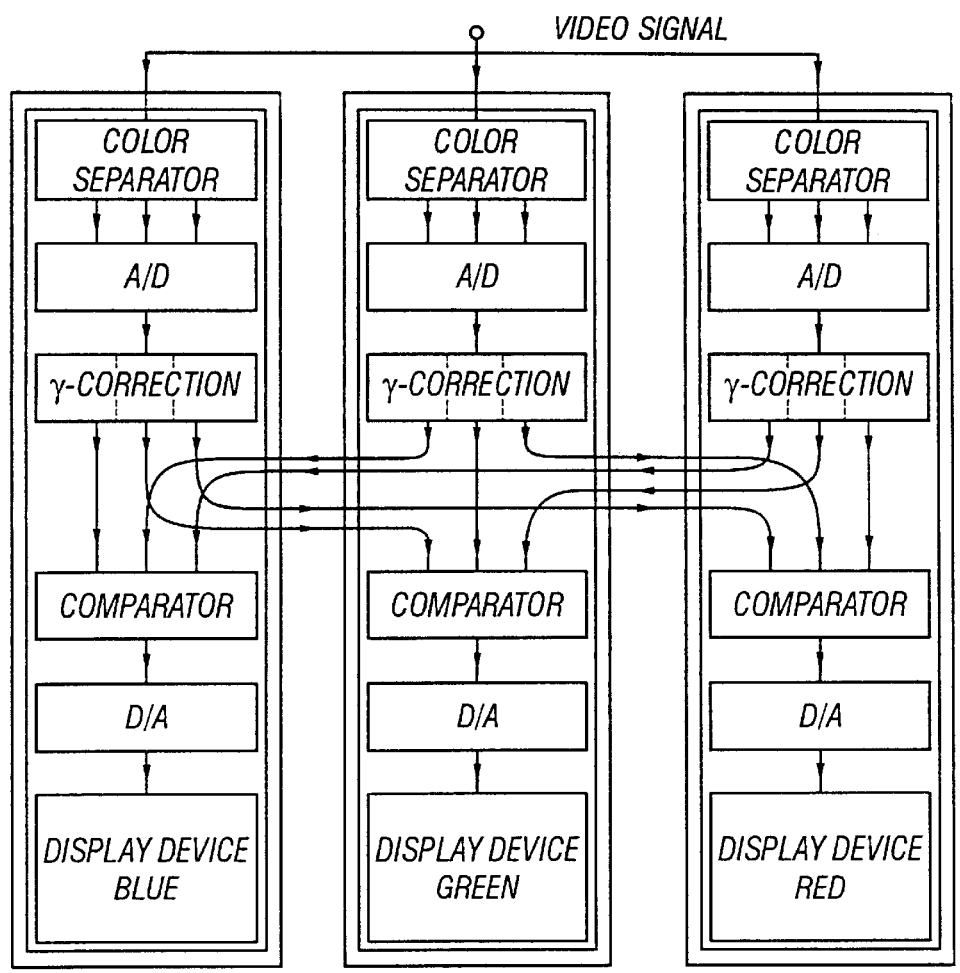
FIG. 5 is a block diagram showing a circuit of a display unit according to a second embodiment of the present invention.

FIG. 5 is a circuit block diagram showing a color display unit according to a second embodiment of the present invention. Signal processing circuits of this embodiment are made up of three substrates. Each of the substrates includes a color separation circuit, an A/D circuit, a γ-correction circuit, a comparing circuit, a D/A circuit, and an optical shutter (display unit).

A video signal is separated into three systems which are then inputted to the color separation circuits of the respective three substrates. As a result, in the respective substrates, three primary color signals are obtained which are then converted into digital signals through subsequent A/D circuits. Further, the digital signals are corrected by the γ-correction circuits. In this embodiment, three systems of the γ-correction circuits are required in each substrate, which is different in structure from the first embodiment. In other words, the γ-correction circuits of this embodiment require capacity three times as much as that of the first embodiment. Also, as in the first embodiment, a blue signal is outputted to a left output, a green signal is outputted to a center output terminal, and a red signal is outputted to a right output terminal among three output terminals of the respective γ-correction circuit.

As is apparent from the figure, the blue signals outputted from all the γ-correction circuits (signals outputted from the left output terminals of the respective γ-correction circuits) are inputted to the comparing circuit of the left substrate (having a blue optical shutter), the green signals outputted from all the γ-correction circuits (signals outputted from the center output terminals of the respective γ-correction circuits) are inputted to the comparing circuit of the center substrate (having a green optical shutter), and the red signals outputted from all the A/D circuits (signals outputted from the right output terminals of the respective γ-correction circuits) are inputted to the comparing circuit of the right substrate (having a red optical shutter). Then, those signals are arithmetically operated in the respective comparing circuits.

Signals outputted from the respective comparing circuits are converted into analog signals through the respective D/A circuits of the respective substrates, and then displayed on the respective optical shutters (display units).

In this embodiment, a noise occurring during the γ-correction processing can also been reduced, which is superior to the first embodiment.

(Third Embodiment)

Figure 6:
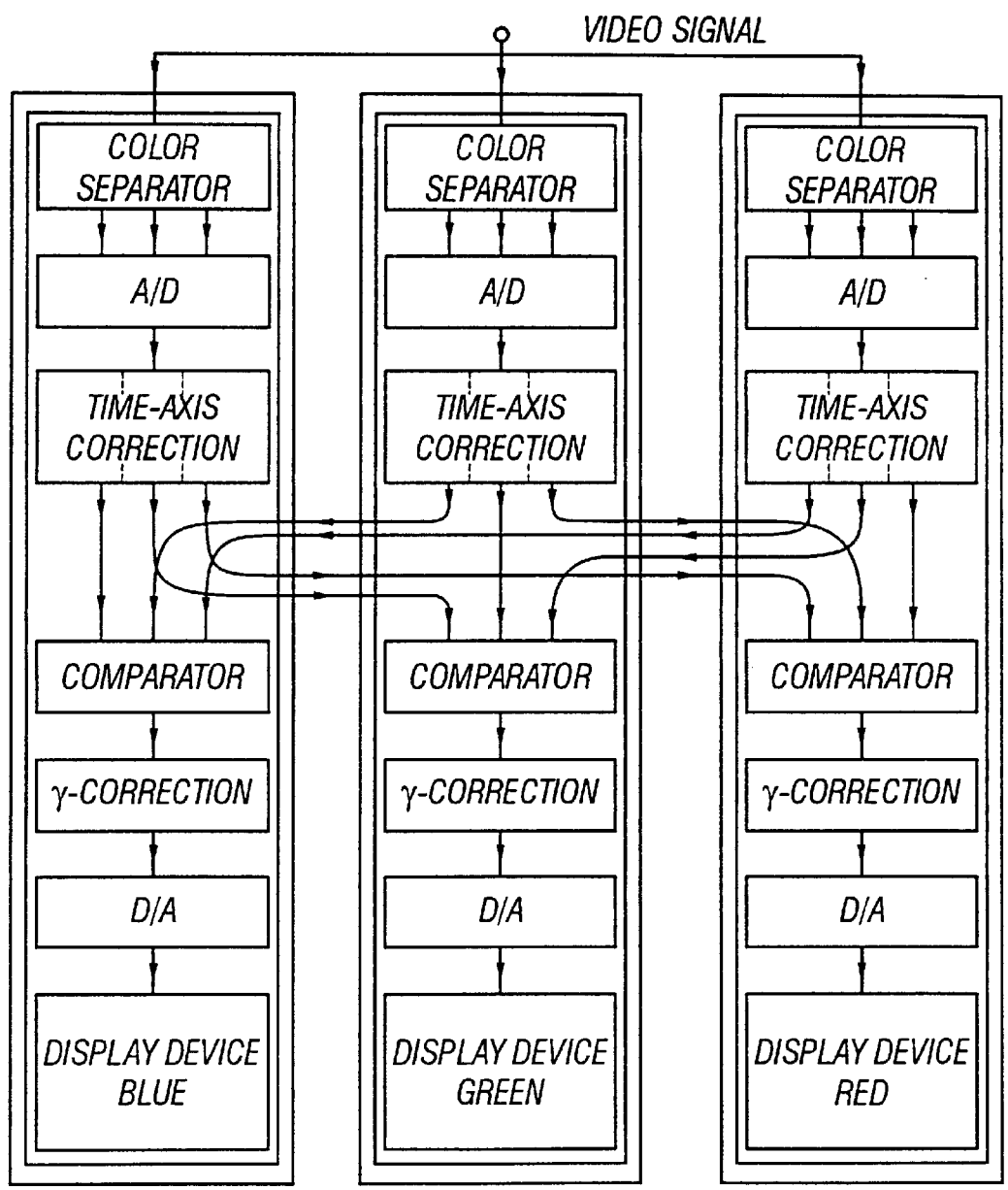
FIG. 6 is a block diagram showing a circuit of a display unit according to a third embodiment of the present invention.

FIG. 6 is a circuit block diagram showing a color display unit according to a third embodiment of the present invention. Signal processing circuits of this embodiment are made up of three substrates. Each of the substrates includes a color separation circuit, an A/D circuit, a time-axis correction circuit, a comparing circuit, a γ-correction circuit, a D/A circuit, and an optical shutter (display unit).

A video signal is separated into three systems which are then inputted to the color separation circuits of the respective three substrates. As a result, in the respective substrates, three primary color signals are obtained which are then converted into digital signals through the subsequent A/D circuits. Further, those digital signals are corrected by the subsequent time-axis correction circuits. As in the γ-correction circuits according to the second embodiment, the time-axis correction circuit of each substrate in this embodiment includes three circuits in correspondence with three primary colors. Also, as in the other embodiments, a blue signal is outputted to a left output terminal, a green signal is outputted to a center output terminal, and a red signal is outputted to a right output terminal among three output terminals of the respective time-axis correction circuits.

As is apparent from the figure, the blue signals outputted from all the time-axis correction circuits (signals outputted from the left output terminals of the respective time-axis correction circuits) are inputted to the comparing circuit of the left substrate (having a blue optical shutter), the green signals outputted from all the time-axis correction circuits (signals outputted from the center output terminals of the respective time-axis correction circuits) are inputted to the comparing circuit of tie center substrate (having a green optical shutter), and the red signals outputted from all the A/D circuits (signals outputted from the right output terminals of the respective time-axis correction circuits) are inputted to the comparing circuit of the right substrate (having a red optical shutter). Then, those signals are arithmetically operated in the respective comparing circuits.

Signals outputted from the respective comparing circuits are transmitted through the γ-correction circuits and the D/A circuits in the respective substrates, and are displayed on the optical shutters (display units).

As was described above, in the projection type color image display unit according to the present invention, the number of parts can be reduced, and the noise can be lowered.

The foregoing description of preferred embodiments of the invention has been presented for the purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method for operating a projector comprising the steps of:
    separating a video signal into three systems;
    inputting the three systems into separation circuits to form three primary color signals;
    converting the three primary color signals into digital signals;
    inputting the digital signal corresponding to red to a first comparator;
    inputting the digital signal corresponding to blue to a second comparator; and
    inputting the digital signal corresponding to green to a third comparator.

2. A method for operating a projector comprising the steps of:
    separating a video signal into three systems;
    inputting the three systems into separation circuits to form three primary color signals;
    converting the three primary color-signals into digital signals;
    correcting the digital signals by γ-correction circuits;
    inputting the corrected digital signal corresponding to red to a first comparator;
    inputting the corrected digital signal corresponding to blue to a second comparator; and
    inputting the corrected digital signal corresponding to green to a third comparator.

3. A method for operating a projector comprising the steps of:
    separating a video signal into three systems;
    inputting the three systems into separation circuits to form three primary color signals;
    converting the three primary color signals into digital signals;
    correcting the digital signals by time-axis correction circuits;
    inputting the corrected digital signal corresponding to red to a first comparator;
    inputting the corrected digital signal corresponding to blue to a second comparator; and
    inputting the corrected digital signal corresponding to green to a third comparator.

4. A method for operating a projector comprising the steps of:
    separating a video signal into three systems;
    inputting the three systems into separation circuits to form three primary color signals;
    converting the three primary color signals into digital signals;
    inputting the digital signal corresponding to red to a first comparator;
    inputting the digital signal corresponding to blue to a second comparator;
    inputting the digital signal corresponding to green to a third comparator;
    correcting an output signal from the first comparator by a first γ-correction circuit;
    correcting an output signal from the second comparator by a second γ-correction circuit; and
    correcting an output signal from the third comparator by a third γ-correction circuit.

5. A method for operating a projector comprising the steps of:
    separating a video signal into three systems;
    inputting the three systems into separation circuits to form three primary color signals;
    converting the three primary color signals into digital signals;
    correcting the digital signals by time-axis correction circuits;
    inputting the corrected digital signal corresponding to red to a first comparator;
    inputting the corrected digital signal corresponding to blue to a second comparator; and
    inputting the corrected digital signal corresponding to green to a third comparator;
    correcting an output signal from the first comparator by a first γ-correction circuit;
    correcting an output signal from the second comparator by a second γ-correction circuit; and
    correcting an output signal from the third comparator by a third γ-correction circuit.

6. A method for operating a projector comprising the steps of:
    separating a video signal into three systems;
    inputting the three systems into separation circuits to form three primary color signals;
    converting the three primary color signals into digital signals;
    inputting the digital signals to comparators;
    inputting output signals from the comparators to γ-correction circuits;
    converting output signals from the γ-correction circuits to analog signals; and
    inputting the analog signals to display devices.

* * * * *